3,490,740
WATERLESS ELECTROLYTE FOR
ELECTROLYTIC CAPACITORS
Olaf Sternbeck, Vallingby, Bengt Ake Lagercrantz, Stocksund, and Kare Andersen, Enskede, Sweden, assignors to Telefonaktiebolaget L M Ericsson, Stockholm, Sweden, a corporation of Sweden
No Drawing. Filed Nov. 30, 1967, Ser. No. 686,839
Claims priority, application Sweden, Feb. 1, 1967, 1,416/67
Int. Cl. H01g 9/02
U.S. Cl. 252—62.2      2 Claims

ABSTRACT OF THE DISCLOSURE

An anhydrous electrolyte for use in electrolytic capacitors consists of a solution of at least partly neutralized phthalic acid in ethylene glycol monomethyl ether.

---

The present invention concerns electrolytic capacitors with aluminium electrodes and refers especially to an electrolyte for the same.

It is known to use an electrolyte for electrolytic capacitors consisting of a boric acid salt solved in a mixture of ethylene glycol or ethylene glycol monomethyl ether and water. A disadvantage of this electrolyte is that it attacks the oxide layer of the electrode which layer constitutes the dielectric of the capacitor. The water of the electrolyte contributes to the successive hydration of the oxide layer, so that the dielectric layer is gradually reduced, while a new non-insulating layer is formed. The phenomenon is evinced by the capacitance of the capacitors gradually increasing together with the losses and the leak current until the capacitor ceases to function as such. The process is accelerated by time and is generally more noticeable at condensers with low rated voltage than in condensers with higher rated voltage.

The speed by which the oxide layer is attacked may naturally be reduced by reducing the water content of the electrolyte. However, the specific resistance of the electrolyte, i.e. the series resistance of the capacitor, is increased as a consequence thereof and also the loss factor.

The portion of the loss factor that depends on the resistance of the eletrolyte is usually inversely proportional to the rated voltage of the capacitor. Therefore, in capacitors for low voltages, below approximately 10 volts, one is obliged to keep the specific resistance relatively low, at 25° C. below about 500 ohm cm. A capacitor for 10 volts with the conventional boric acid electrolyte having this resistance can function hardly 1000 hours at a temperature of 70° C., which in many cases is not satisfactory.

The conventional boric acid electrolyte also has the disadvantage that the impregnation of the capacitor paper with this electrolyte is difficult to carry out as the paper swells up because of the water content of the electrolyte.

In order to avoid these disadvantages one has tried to obtain waterless electrolytes but due to the fact, that the majority of salts are difficult to solve or very little dissociate in other liquids than water, one encounters the problem to obtain an electrolyte with a sufficiently low resistance. The contents of the electrolyte must furthermore have a sufficient thermal stability and must not attack the oxide layer.

According to the invention, an electrolyte is obtained that fulfils all these requirements and that also has a relatively low prdouction cost. It consists of a solution of wholly or partly neutralized phthalic acid in ethylene glycol monomethyl ether.

In the following three examples are given on the composition of the electrolyte.

Example 1

Ethylene glycol monomethyl ether _____ ml__ 50
Phathalic acid _____ g__ 9.5
Morpholine _____ ml__ 5

This electrolyte has a specific resistance of 200 ohm cm. at 25° C.

Example 2

Ethylene glycol monomethyl ether _____ ml__ 50
Phthalic acid _____ g__ 31.7
Triethylamine _____ ml__ 25.6

The specific resistance of this electrolyte is 170 ohm cm. at 25° C.

Example 3

Ethylene glycol monomethyl ether _____ ml__ 50
Phthalic acid _____ g__ 8
Cyclohexylamine _____ ml__ 5.5

The specific resistance of this electrolyte is 275 ohm cm. at 25° C.

As seen in the examples all these electrolytes have a low resistivity and furthermore a good chemical stability and give insigificant attack on the aluminium oxide. During a test of long duration carried out with 8 volt capacitors provided with an electrolyte according to Example 3, the following values were obtained on the capacitance C, the loss factor tgδ and the leak current I.

|  | C MF | tgδ | I μA |
|---|---|---|---|
| 0 h | 226 | 0.157 | 6 |
| 1,000 h | 231 | 0.133 | 1 |

The test was carried out at a voltage equal to the rated voltage and at a temperature of 100° C. The leak current I was measured one minute after connecting the voltage, whereby after an 1000 hour test the condenser was primarily cooled down. At test carried out with the corresponding capacitors having the conventional electrolyte of boric acid and ethylene glycol subjected to the same testing conditions, the capacitors exploded within 100 h.

Because of manufacturing reasons, insignificant contents of water may sometimes be difficult to avoid. Water contents below 5%, however have no decided influence on the conductivity. The attack on the oxide caused by the water content, may be reduced in the known way by the addition of phosphate ions.

Such small contents of water and phosphate admitted because of practical reasons, do naturally not given any improvement of the electrolyte but do, however, not cause any noticeable damage.

We claim:
1. Electrolyte for electrolytic capacitors with aluminium electrodes consisting essentially of a solution of phthalic acid at least partly neutralized by an amine in ethylene glycol monomethyl ether.
2. Electrolyte according to claim 1 wherein the phthalic acid is neutralized by triethylamine.

References Cited

UNITED STATES PATENTS 2,945,164   7/1960   Taylor _____ 252—62.2 X

FOREIGN PATENTS 1,103,443   2/1968   Great Britain.

ROBERT D. EDMONDS, Primary Examiner

J. COOPER, Assistant Examiner

U.S. Cl. X.R.

317—230